(No Model.)  3 Sheets—Sheet 1.

H. STOLLWERCK.
GRAIN DRIER.

No. 324,182.  Patented Aug. 11, 1885.

Witnesses
J. A. Rutherford
Robert Everitt

Inventor
Heinrich Stollwerck
By James L. Norris
Atty.

N. PETERS, Photo-Lithographer, Washington, D. C.

(No Model.)
H. STOLLWERCK.
GRAIN DRIER.
No. 324,182. Patented Aug. 11, 1885.
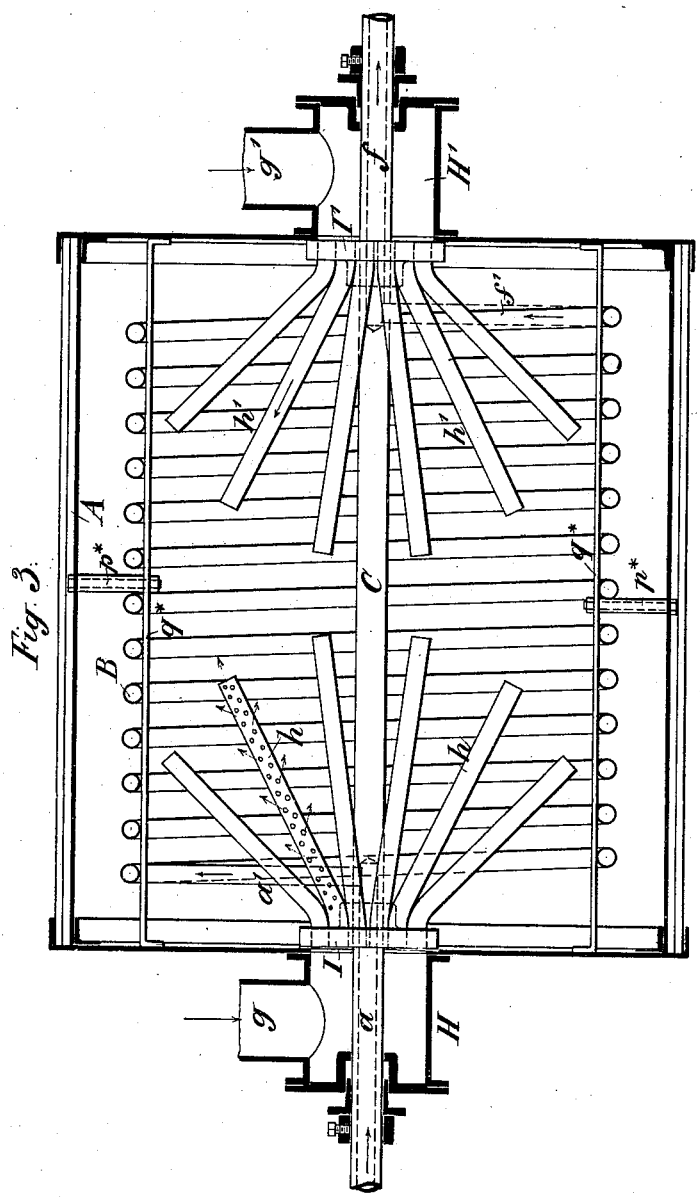
Witnesses.
J. A. Rutherford
Robert Everett
Inventor.
Heinrich Stollwerck,
By James L. Norris.
Atty.

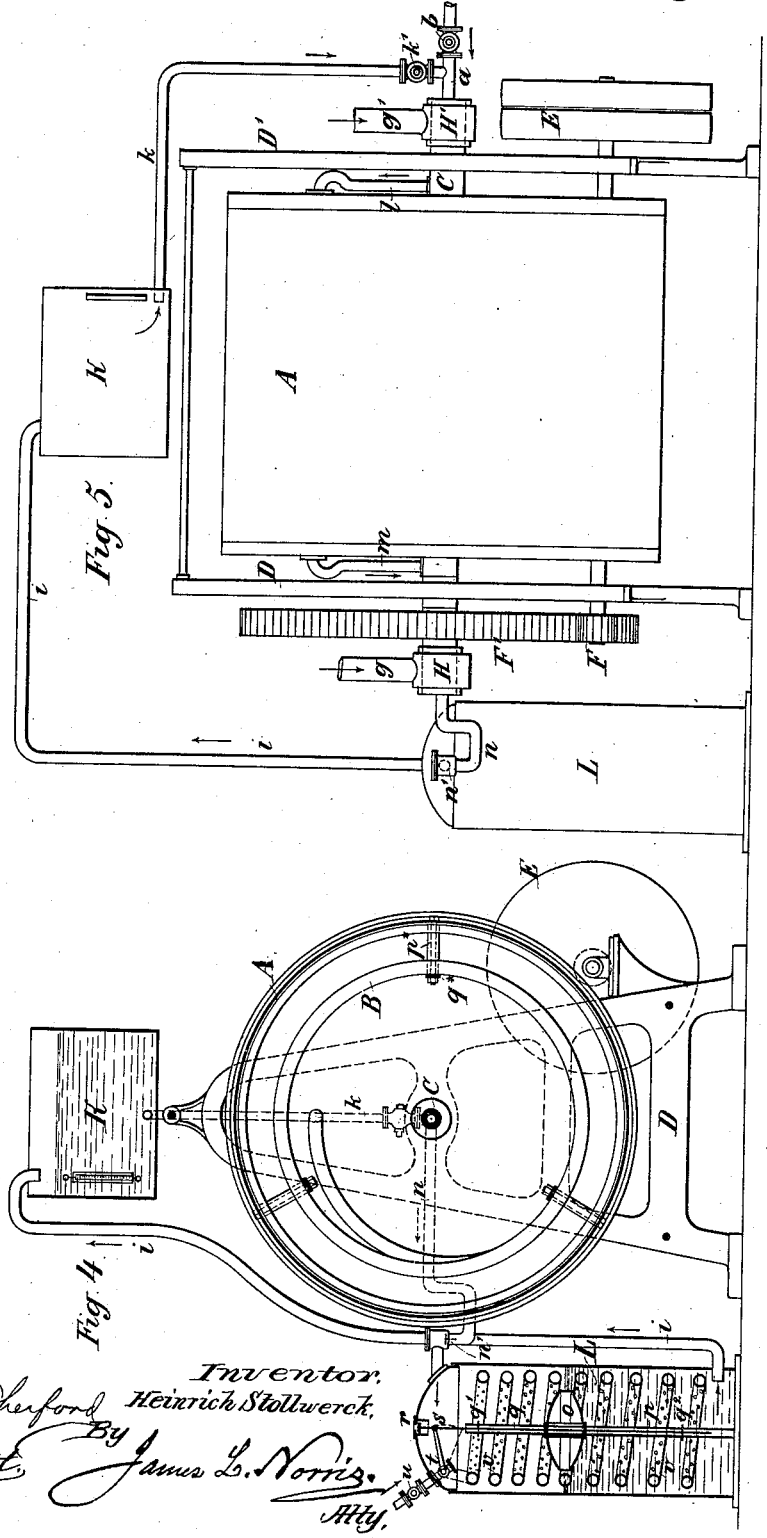

UNITED STATES PATENT OFFICE.

HEINRICH STOLLWERCK, OF COLOGNE-ON-THE-RHINE, PRUSSIA, GERMANY, ASSIGNOR TO GEBR. STOLLWERCK, OF SAME PLACE.

GRAIN-DRIER.

SPECIFICATION forming part of Letters Patent No. 324,182, dated August 11, 1885.

Application filed January 8, 1885. (No model.) Patented in England December 11, 1884, No. 16,313.

*To all whom it may concern:*

Be it known that I, HEINRICH STOLLWERCK, of the city of Cologne-on-the-Rhine, in the Kingdom of Prussia and German Empire, have invented a certain new and useful Improvement in the Apparatus for Drying and Roasting Grain, Coffee, and Similar Substances, (for which I have obtained Letters Patent in Great Britain, No. 16,313, dated December 11, 1884,) of which the following is a specification, reference being had to the accompanying drawings, and to the letters of reference marked thereon.

This invention has for its object to provide a novel apparatus for drying or roasting cocoa, coffee, grain, and similar substances; and to this end the invention consists in the combination of devices hereinafter described and claimed.

The invention relates to an improvement in the apparatus forming the subject-matter of my Letters Patent No. 308,529, dated November 25, 1884, and the present invention is illustrated in the accompanying drawings, in which—

Figure 2:
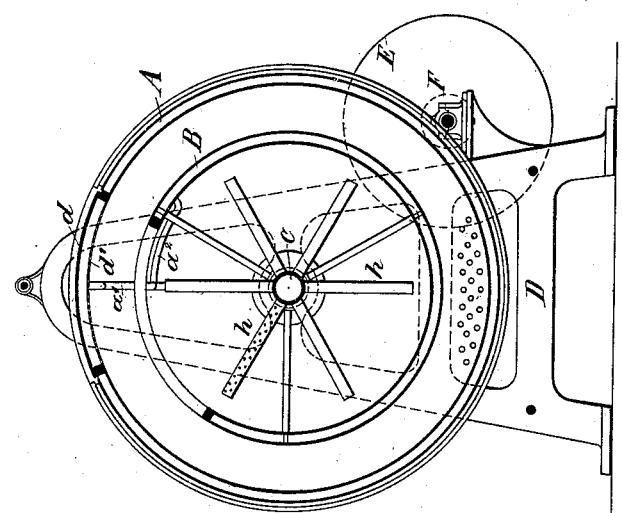
Figure 1:
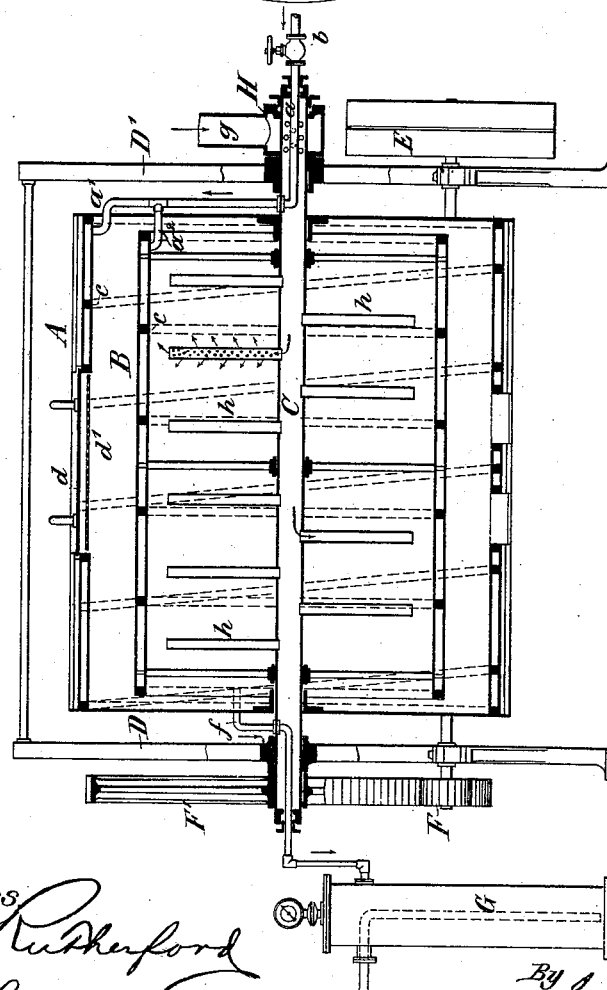

Figure 1 is a vertical longitudinal section of the said apparatus, the latter here consisting of two heating-drums. Fig. 2 is a vertical transverse section of the apparatus shown in Fig. 1. Fig. 3 is a view of a drum, showing a modified arrangement of the serpentine pipe, referred to in the said former specification, and also showing a modification in the air-pipes used in combination with the tempering devices. Fig. 4 is a vertical transverse section of the drying and roasting apparatus, in combination with a device for tempering by means of hot water and an air-cooling device. Fig. 5 is a side elevation of the same.

The heating-drum shown in Figs. 1 and 2 consists of an outer closed steam-casing A, surrounded with some suitable material to prevent the radiation of heat, and an inner steam-casing, B, having a longitudinal opening, as shown in Fig. 2. Both steam-casings, which are hollow, as hereinafter described, are rigidly mounted on the hollow shaft C, so as to rotate therewith. The heating-drum may be provided with a heating serpentine pipe or coil, as in Fig. 3, or as described in the said former specification, or it may be constructed with but one steam-casing. The shaft C is journaled in the standards D D', and is rotated by means of the belt-pulley E and gear-wheels F and F', or in some other suitable manner. The said shaft C is hollow, and is entered by the steam-inlet pipe $a$, having the stop-valve $b$. A continuation of the said steam-inlet pipe leaves the said hollow shaft in a lateral direction and branches off into two arms, $a'$ and $a^2$, these communicating with the hollow spaces of the steam-casings A and B, respectively.

Each of the two steam-casings is formed of two sheet-metal cylinders, those of each pair forming one steam-casing being placed one within the other, or telescoped. The cylinders forming the casing B are cut away for about one-quarter of their circumference in the direction of their axis, so as to cause the material roasted in the casing or drum to be thoroughly mixed during the rotation of the drum. The space between each two cylinders forming a steam-casing contains a number of partitions, arranged either spirally, like the threads of a screw, as in the casing A, or arranged rectangularly to the axis of the casings or drums, as in the drum B. In the latter arrangement the partitions are provided with openings, so as to establish communication between the several spaces between the rings or partitions. These openings are made so that those of one partition alternate with and are as far as possible from those of the next partition, the object of this arrangement being to cause the steam in passing between the walls of each casing to pass over the entire surface thereof, and thereby communicate to the latter its heat.

The material to be dried or roasted is introduced into the drums through an opening provided with a sliding lid, $d$. The steam, which may be superheated, after having passed through the casing, which it enter through the cock $b$ and branches $a'$ $a^2$, re-enters the hollow shaft at the opposite end thereof through the pipe $f$, and thence passes through a stuffing-box into the condenser G, where it is condensed.

In order to obtain the exact degree of heat required, according to the kind of fruit or material which is being dried or roasted, and to maintain this tempered temperature, (as indicated by a thermometer arranged in combination with the drum,) the hollow shaft C communicates, by means of the conduit $g$, with a blower or ventilator, (not shown in the drawings,) the said blower causing a current of cold air to enter the drum, either at intervals or continuously, as may be required, whereby the temperature may be regulated. The pipe $g$ enters a cylindrical chamber, H, through which the hollow shaft C passes, all joints or connections fitting closely. The said shaft is provided within the chambers H with a number of openings or perforations, through which the blast of air enters the said hollow shaft C. In the latter are inserted a number of open pipes, $h$, provided with perforations and extending radially in such a manner that the air issuing from the said perforations is well distributed on entering the drums B and A, the head-plates of the latter being provided with small perforations to permit the exit of some of the air. The pipes $h$ rotating with the said drum or drums do not interfere with the material to be dried or roasted, which only strikes the said pipes $h$ by its own weight in passing, without being crushed or injured in any way.

It being possible by simply adjusting the stop-valve $b$ to regulate the inflow of steam into the interior of the casings A B, and, by means of a throttle-valve arranged in the air-conduit, to control in a similar manner the quantity of air forced into the drums from the ventilator or blower, it results that any temperature required for any material whatsoever to be dried or roasted—say, for instance, a temperature of from 65° to 100° Celsius for malt or succory—may be obtained and maintained in an empirical manner.

The drying or roasting of the material in question having been completed, the steam is entirely shut off by closing the stop-valve $b$ and the full blast of cold air admitted from the ventilator, so as to thoroughly and completely cool the material within the said drums.

As shown in the drawings, a sliding lid, $d'$, provided with a number of perforations or apertures, the size of which varies according to the character of the material to be roasted, is arranged below the sliding lid $d$, so that the vapors forming within the drum, as well as the cool air introduced therein, may be let off more or less quickly. After sliding back the lid $d$ it is possible to observe the coloring of the material being roasted while the drum rotates, and to judge from its appearance how far the roasting process has advanced. For the same purpose holes filled with glass may also be arranged on the periphery of the drum, such arrangement being impossible in the former roasting methods where an open fire was employed.

The inner sides of the drum may be provided with a piece of sheet metal riveted thereon edgewise and set diagonally. When the drum is made to rotate, the material to be roasted is shifted to and fro by the said sheet-iron piece, thereby increasing in a great measure the regularity and uniformity of the roasting.

The drum shown in Fig. 3, and intended for drying or roasting in the same manner as above described, differs from the first-described construction only in so far as regards the serpentine pipe or coil described in the said former specification. According to the present invention it is employed in a somewhat different and more simplified manner. The arrangement of the air inlet-pipes is also somewhat modified. The serpentine pipe in this instance is a single one, but is of a correspondingly-enlarged diameter, resting on the supporting-bars $q^*$, the latter being secured to the head-plates of the drum A, and also by means of bolts $p^*$ to the peripheral walls of the drum.

The steam, which, according to the character of the material to be dried or roasted, is either in a superheated condition or at its normal pressure, passes at the end $a$ into the hollow shaft C, and thence through the pipe $a'$ into the serpentine pipe B. After having passed through the latter it again enters the hollow shaft C through the pipe $f'$, and is discharged from the hollow end $f$ of the shaft. On the ends of the drum A air-chambers H H' are here provided, which are supplied with cold air from the ventilator or blower through the pipes $g\ g'$. The shaft C has two hubs, I I', the flanges of which have perforations or openings, and which rotate at the heads of the air-chambers H H'. In the said openings are inserted the perforated pipes $h\ h'$, respectively, the said pipes projecting into the drum at both ends thereof and being arranged in radiating clusters. The air-blast from the ventilator passes to the material in the drum from these pipes, permeates the said material, and, as the case may be, tempers or reduces its temperature in the same manner as already described with reference to Figs. 1 and 2, after the process of drying or roasting has been completed and the steam-supply cut off.

In Figs. 4 and 5 another device is shown in connection with the device for supplying a cold-air blast, the object of this device being to produce the proper temperature required for drying or roasting by means of hot water.

With certain materials which require but slow drying or roasting—such as malt, &c.— at a temperature of from 60° to 80° Celsius, the contact of such materials with the serpentine pipe or steam-casing containing steam of from four to six atmospheres, and hence having a temperature of from 140° to 160° Celsius, and always above 100° Celsius, may in some cases prove injurious to the material. It is therefore deemed advantageous in such cases to be able to heat the serpentine or its equivalent—i. e., the steam casing or casings—with water having a maximum temperature of from 80° to 100° Celsius instead of using steam for the purpose. To this end, therefore, a water-reservoir, K, having an inlet-pipe, $i$, and a discharge-pipe, $k$, is mounted above the drum A. Now, supposing that it be desired to suspend the heating with steam and to begin heating with water, all that will be necessary is to close the stop-valve $b$, and to open the valve $k'$, whereupon the hot water from the reservoir K will, in the same manner as described with regard to the steam, enter the hollow shaft C, will pass thence through the serpentine pipe B, and ultimately through the pipe $m$, the hollow shaft, and the pipe $n$ into a receptacle, L. A back-pressure valve, $n'$, is provided within the pipe $n$ in order to prevent the discharged water from re-entering the latter, and the receptacle L is provided inside with a float, O, which slides on a tube surrounding a rod, $q$. The said rod $q$ has two projections or pegs, $q'$ $q^2$, which project from the surrounding tube $p$, and it carries an air-valve, $r$, and a pivot, $s$, the latter being connected with the lever or handle of the cock $t$, arranged within the receptacle L. A regulating-cock, $u$, is also provided on the outside, by means of which steam may be admitted into the receptacle L, the said steam entering a finely-perforated serpentine pipe, $v$, whence it is discharged into the water contained in the said receptacle, so as to heat the water. The latter gradually rises in the receptacle L, thereby lifting the float O, the air-cock $r$ remaining open all the while and the cock $t$ being held closed. On rising to a certain height the float O strikes the upper projection, $q'$, thereby closing the air-valve and turning the lever of the cock $t$ until the said cock is opened. The steam, thereupon suddenly entering through the cock $t$, acts on the water like a pulsometer, causing the same to rise in the pipe $i$, whence it is again discharged into the reservoir K until the float strikes the lower projection, $q^2$, thereby closing the cock $t$ again and opening the air-valve $r$, so that the water passing through the serpentine pipe B and pipe $n$ may again collect in the receptacle L until the operation above described is repeated.

When it is desired to heat the water to a very high degree, the regulating-cock $u$ is opened as wide as possible, in order to let the steam pass through the entire length of the serpentine pipe $v$ and to heat the water in rising up to boiling-point, it being evident that the smaller the passage of the cock be adjusted the less of the length of the perforated serpentine pipe $v$ will be passed by the steam, as the latter will issue more from the perforations of the upper part of the said serpentine pipe, and will thus have a tendency rather of forcing the water into the reservoir K than of heating the same.

The roasting process being completed, the valves $k'$ and $u$ are closed, the ventilator-conduits are opened, and a cool blast is introduced, by means of the pipes $g$ $g'$ and the hollow shaft C, into the drum, so as to cool the material therein quickly.

In such cases where it is desired only to effect a rapid cooling of the roasted material or to obtain only a slight roasting of the same, the air-pipes $h$, communicating with the conduit $g$ and the drum A and participating in the rotary movement of the latter, may be arranged, in the same manner as described, within a secondary drum constructed of wire-cloth or perforated sheet metal and of any desired sectional shape, the said secondary drum being arranged apart from and independently of the drum A. The material to be dried or roasted is put into such perforated or sieve-like secondary drum.

In case raw materials requiring only slight drying are put in the said perforated or sieve-like secondary drum, it will be found sufficient to connect the ventilator-ducts with a heating-chamber, and then to blow in hot air first.

The drying process having been completed in this manner, the ventilator and the heating-chamber are disconnected again, and a cold-air chamber is connected with the ventilator, so as to cause the hot material to cool quickly.

Having thus described my invention, what I claim as new, and desire to secure by Letters Patent, is—

1. In a steam roasting or drying apparatus, the combination of the hollow rotating shaft C, the drum A, and chambered drum B, fitted one within the other, and both connected with shaft C to rotate therewith, the steam-inlet pipe entering the hollow shaft and having a lateral branch communicating with the steam-space of chamber B, and the steam-exit pipe leading out from said space through the hollow shaft, substantially as described.

2. In a steam roasting or drying apparatus, the combination, with drum A and chambered drum B, a hollow shaft carrying the said drums, and steam inlet and exit pipes entering said shaft and communicating with the steam-chambers of the drum, of the air-chamber surrounding the end of the shaft and the air-discharge pipes located within the drum B to rotate therewith and communicating with said air-chamber, substantially as described.

3. In a steam roasting or drying apparatus, the combination, with the drum A, and chambered drum B, and the hollow shaft carrying the same, and the inlet and exit pipes communicating with the chambers of said drum, of the reservoir K, communicating with the inlet-pipe by pipe $k$, and the receptacle L, connected with the exit-pipe and communicating with reservoir K through pipe $i$, substantially as described.

4. In a steam roasting or drying apparatus, the combination, with the drum A and chambered drum B, having an inlet and an exit pipe to its chamber, of the reservoir K, communicating with the chamber of drum B, and receptacle L, communicating with reservoir K and exit-pipe of drum B, and provided with a perforated serpentine pipe, *v*, connected with a steam-pipe having a cock, *u*, and stop-cock *t*, an air-valve, a rod connected to said valve and to stop-cock *t*, and a float, *o*, connected with said rod to control said air-valve and stop-cock, substantially as described.

In testimony whereof I have signed my name to this specification in the presence of two subscribing witnesses.

HEINRICH STOLLWERCK.

Witnesses:
SAMUEL SPACKMAN,
TH. PEITMANN.